April 16, 1963     A. C. FRANCOIS     3,086,163
SHORT CIRCUIT PROTECTION OF REGULATED POWER SUPPLY
Filed May 24, 1961
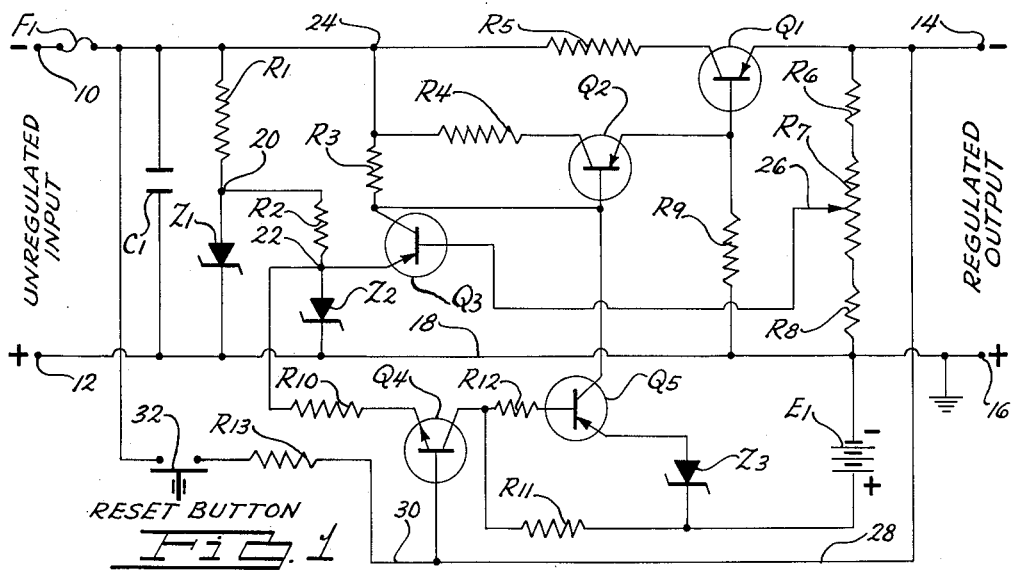
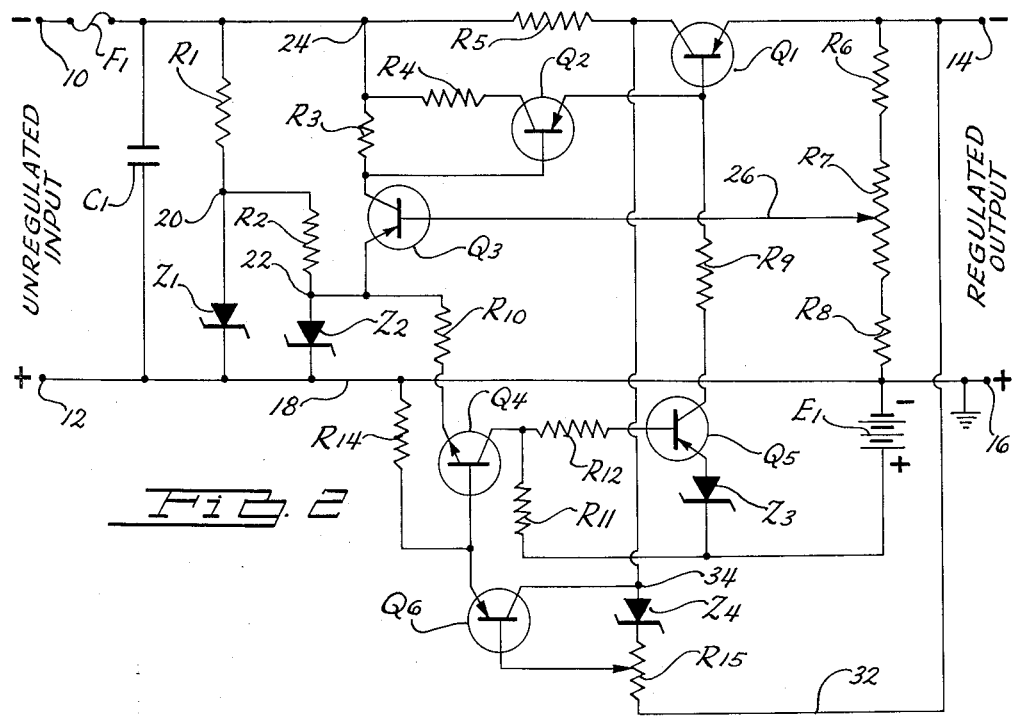
INVENTOR.
ALEX C. FRANCOIS
BY
Bower & Patalidis
ATTORNEYS United States Patent Office 3,086,163
Patented Apr. 16, 1963

3,086,163
SHORT CIRCUIT PROTECTION OF REGULATED POWER SUPPLY
Alex C. Francois, Farmington, Mich., assignor to Ex-Cell-O Corporation, Detroit, Mich.
Filed May 24, 1961, Ser. No. 112,302
6 Claims. (Cl. 323—22)

The present invention relates to regulated power supplies and more particularly to power supplies affording a short circuit protection of the transistors utilized as voltage regulators of the power supply.

It is well known in the art that a direct current regulated voltage may be derived from an unregulated voltage source by connecting a regulator transistor in series between the unregulated supply and the utilization or load circuit, to control and regulate the current flow from the unregulated source to the load circuit. The state of conduction of the regulator transistor is controlled by a control circuit sensing the variations of the output voltage supplied to the load.

In prior art power supplies using this general type of series transistor regulators, a short circuit in the load, or utilization circuit, causes an excessive amount of current to flow through the series transistor, thereby damaging or even destroying the transistor. Normal fusing of the power supply circuit does not operate fast enough to prevent damage to the regulator transistor.

It is therefore an object of this invention to provide an improved power supply utilizing a semi-conductor voltage regulator which is protected against short circuits in the utilization circuit.

It is a further object of this invention to provide a power supply that will automatically reduce the amount of current supplied to the load in case of shorting in the utilization circuit.

It is another object of this invention to provide a power supply that remains automatically in an "off" state as long as the short circuit in the utilization circuit is not removed.

It is a further object of this invention to provide a power supply that is automatically restored to an "on" state as soon as the short circuit in the load is removed.

These and other objects and advantages of the present invention will become apparent upon consideration of the following description when read in connection with the accompanying drawings in which:

FIG. 1 is a schematic circuit drawing illustrating an embodiment of the present invention; and FIG. 2 is a schematic circuit drawing of a modification of the present invention.

Referring now to the drawings and in particular to FIG. 1, there is shown a schematic circuit diagram of the short circuit proof voltage regulator of the present invention. A pair of input terminals 10 and 12 is connected to an unregulated voltage source, with the input terminal 10 receiving a negative potential and the input terminal 12 receiving a positive potential. A filtering capacitor C1 is connected across the input terminals, in the usual manner. Terminal 10 is connected through a fuse F1 to a resistor R5 and to the collector electrode of PNP transistor Q1 placed in series. The purpose of the resistor R5 is to limit the amount of current passing through the transistor Q1 when the load, or utilization circuit, demands an increase of power substantially greater than normal.

The transistor Q1 is a regulator transistor, that is, its state of conduction is varied inversely with variations in the voltage supplied to the utilization circuit, by means of a sensing and control circuit, hereinafter described, which operates upon the voltage of the base electrode of the transistor Q1 which is normally biased by a resistor R9 connected to the positive potential.

The regulated voltage is supplied to a pair of output terminals 14 and 16. The emitter electrode of the transistor Q1 is connected to the output terminal 14, and the input terminal 12 is connected directly to the output terminal 16 by a lead 18 which is preferably grounded to the chassis.

A resistor R1 and a Zener diode Z1 are connected across the input terminals, and a resistor R2 and another Zener diode Z2 are connected across junction 20, between resistor R1 and Zener diode Z1, and the lead 18. Resistors R1—R2, in conjunction with Zener diodes Z1—Z2 make up a highly stable voltage reference network.

A PNP transistor Q3 has its emitter electrode connected to junction 22, between the resistor R2 and the Zener diode Z2; consequently the emitter electrode of the transistor Q3 is placed at a constant voltage. The collector electrode of the transistor Q3 is connected to junction 24 through a resistor R3. A PNP transistor Q2 has its emitter electrode connected directly to the base electrode of the transistor Q1, its collector electrode connected to junction 24 through a resistor R4, and its base electrode connected directly to the collector electrode of the transistor Q3.

Across the output terminals are connected a resistor R6, a potentiometer R7 and a resistor R8. A lead 26 connects the slider of the potentiometer R7 to the base electrode of transistor Q3 and the voltage of the base electrode of transistor Q3 is normally set at a value which is substantially the same as the voltage of the emitter electrode of transistor Q3.

Any variation of voltage across the output 14—16 will be sensed by the base electrode of the transistor Q3, because the said base electrode is connected to the slider of the potentiometer R7. The transistor Q3 acts as a direct current amplifier, amplifying the small variations in output voltage. If, for example, the voltage across the output terminals 14—16 increases, the voltage applied to the base electrode of the transistor Q3 increases, becomes therefore more negative. This causes the base electrode of the transistor Q3 to become more negative with respect to its emitter electrode. The transistor Q3 conducts more strongly causing a larger current to flow through the resistor R3. As the current flow through the resistor R3 increases, the voltage drop across the resistor R3 increases also, therefore the voltage applied to the base electrode of the transistor Q2 decreases. The transistor Q2 acts as an emitter follower and the voltage of its emitter electrode follows the variation of voltage of its base electrode. Therefore the voltage on the collector electrode of the transistor Q3 appears on the emitter electrode of the transistor Q2. The transistor Q2 acts as an emitter follower and the voltage of its emitter electrode follows the variation of voltage of its base electrode. Therefore the voltage on the collector electrode of the transistor Q3 appears on the emitter electrode of the transistor Q2. The transistor Q1, is also an emitter follower, and the variations of voltage of its emitter electrode follow the variations of voltage of its base electrode, the latter being the same as the variations of voltage of the emitter electrode of the transistor Q2. Therefore any decrease of voltage on the base electrode of the transistor Q2 results in a decrease of voltage on the emitter electrode of the transistor Q1. As the decrease of voltage on the base electrode of the transistor Q2 was caused by an increase of voltage across the output terminals 14—16, the resulting decrease of voltage on the emitter electrode of the transistor Q1 will compensate the increase of voltage across the output terminals 14—16, thereby regulating the voltage across the said terminals to a substantially constant value, irrespective of load variations.

In the event that there is an increase in current demand from the utilization circuit, the resistor R5 limits, as hereinbefore mentioned, the current flow through the transistor Q1, to a safe value. In the event of prolonged overload, the fuse F1 melts and protects the regulator transistor Q1. But in the event of a sudden short circuit in the utilization circuit, the fuse, because of its time lag, does not melt until the transistor Q1 has been damaged or even destroyed. The transistors Q4 and Q5 are therefore added to the basic regulator circuit heretofore described, and serve as control means in a protective circuit preventing destruction of the regulator transistor Q1, in the event of short circuit in the utilization circuit.

The circuit breaker portion of the regulated power supply circuit will now be described:

A NPN transistor Q4 has its base electrode connected by a lead 28 to the negative branch of the output terminals. The emitter electrode of the transistor Q4 is connected to junction 22 through a resistor R10. The collector electrode of the transistor Q4 is connected to the positive terminal of a direct current voltage source E1, through a resistor R11. The negative terminal of the direct current voltage source E1 is connected to the common ground positive lead 18. A PNP transistor Q5 has its base electrode connected to the collector electrode of the transistor Q4 through a resistor R12 and its collector electrode connected directly to the base electrode of the transistor Q2. The emitter electrode of the transistor Q5 is placed at a fixed positive potential by being connected to the positive terminal of the voltage source E1 through a Zener diode Z3.

When the power supply is functioning normally, the base electrode of the transistor Q4 is maintained at a high negative potential and its emitter electrode is maintained at a constant lower negative potential due to the Zener diode Z2 through which it is connected to the ground reference lead 18; the collector electrode of the transistor Q4 is connected to the positive terminal of the direct current supply source E1 and under those conditions, the transistor Q4 is switched off.

The positive potential of the source E1 is applied through resistors R11 and R12 to the base electrode of the transistor Q5 and, because the transistor Q4 is in the "off" condition, the voltage applied to the base electrode of the transistor Q5 is substantially the same as the voltage of the positive terminal of the source E1. The emitter electrode of the transistor Q5 is placed at a potential which is more negative than the potential of its base electrode, by being connected to the positive terminal of the source E1 through a Zener diode Z3 which establishes a predetermined drop of potential. Under those conditions, the transistor Q5 is prevented from conducting.

If a short circuit occurs in the utilization circuit beyond output terminals 14—16, the potential of terminal 14 tends toward zero. The potential of the base electrode of the transistor Q4 tends toward zero, while the potential of its emitter electrode remains at a fixed negative value set by the Zener diode Z2. Under these conditions, transistor Q4 conducts heavily, causing the potential of its collector electrode to drop substantially. The potential at the base electrode of the transistor Q5 being substantially the same as the potential at the collector electrode of the transistor Q4, the potential at the base electrode of the transistor Q5 drops to a low value, causing transistor Q5 to conduct heavily. The impedance of transistor Q5 drops to a very low value, as it is in a high conductance state, causing its collector electrode to assume a positive potential, which in turn causes the base electrode of transistor Q2 to assume a positive potential. Transistor Q2 being an emitter follower, its emitter electrode assumes a potential which is substantially the same as the potential of its base electrode, in other words its emitter electrode assumes a positive potential. Consequently, the base electrode of transistor Q1 which is connected to the emitter electrode of transistor Q2, assumes also a positive potential, thereby placing the regulator transistor Q1 in a high impedance state and preventing power from being delivered to the output terminals 14—16.

The base electrode of the transistor Q4, besides being connected to the output terminal 14, is also connected by a lead 30 to the input terminal 10 through a resistor R13. In lead 30 is placed a switch 32 which is normally in the open position. A reset button is depressed to close the switch 32, once the short circuit in the utilization circuit has been detected and corrected. Closing switch 32 impresses the negative potential of the input terminal 10 upon the base electrode of the transistor Q4, which brings the transistor Q4 to its cut off state. This causes the circuit breaker portion of the circuit to become inoperative and the regulator transistor Q1 will begin again to function normally.

If the reset button is pressed when the short circuit is still present, all of the difference of potential between the input terminal 10 and the output terminal 14 is dropped across the resistor R13, and the base electrode of the transistor Q4 remains at a potential which is the same as the potential of the output terminal 14, that is, it remains at a potential close to zero. Transistor Q4 remains conducting and the circuit breaker portion of the circuit cannot be reset until the short circuit has been cleared.

Referring now to FIG. 2, there is shown a schematic circuit drawing of a modification of the present invention illustrating a power supply voltage regulator that is also short circuit proof, but that requires no resetting by an operator after the short circuit in the utilization circuit has been cleared.

The regulator portion of the circuit and the sensing and control portion of the circuit are substantially the same as have been hereinbefore described in reference to FIG. 1. However the base electrode of the regulator transistor Q1 is connected through a resistor R9 to the emitter electrode of a transistor Q5, instead of being connected to the lead 18.

The circuit breaker portion of the circuit illustrated in FIG. 2, consisting of a NPN transistor Q4, two PNP transistors Q5 and Q6, and their associated circuitry, will now be described:

The transistor Q4 has its emitter electrode connected to junction 22 through a resistor R10, its base electrode connected to the common grounded positive lead 18 through a resistor R14 and its collector electrode connected to the positive terminal of a direct current voltage source E1, through a resistor R11. The negative terminal of the direct current voltage source E1 is connected to the common positive lead 18.

The transistor Q5 has its base electrode connected to the collector electrode of the transistor Q4 through a resistor R12, its collector electrode connected, as hereinbefore mentioned, to the base electrode of the transistor Q1 through a resistor R9 and its emitter electrode is placed at a fixed positive potential by being connected through a Zener diode Z3 to the positive terminal of the direct current source E1.

A branch lead 32 connects the collector electrode of the transistor Q1 to the negative output terminal 14; in branch lead 32 are connected in series a Zener diode Z4 and a potentiometer R15. The transistor Q6 has its base electrode connected to the slider of the potentiometer R15 and its collector electrode connected to junction 34 between the collector electrode of the transistor Q1 and the Zener diode Z4. The emitter electrode of the transistor Q6 is connected to the base electrode of the transistor Q4.

With no short circuit in the utilization circuit beyond the output terminals 14—16, the circuit breaker, or protective circuit, portion of the circuit is deactivated because of the following conditions being present:

There is a drop of potential across the regulator transistor Q1 which results in the junction 34 being at a potential lower than the potential at the output terminal 14, or in other words, the potential at junction 34 is slightly more negative than the potential at the output terminal 14. The Zener diode Z4 is chosen as being in a non-conductive state for such a small difference of potential and under those conditions junction 34 is disconnected from the output terminal 14.

The base electrode of the transistor Q6 is therefore at the same voltage as the output terminal 14. The transistor Q6 being operated as an emitter follower, its emitter electrode repeats this voltage across the resistor R14. The base electrode of the transistor Q4 is therefore placed at a voltage which is much more negative than the voltage of its emitter electrode which is placed at the small negative voltage determined by the Zener diode Z2. Under these conditions, the transistor Q4 is held in a non-conductive state and the transistor Q5 is consequently also in a non-conductive state, because its base electrode is at the positive potential of the positive terminal of the source E1. In the event that a short circuit occurs beyond the output terminals 14—16, the potential of output terminal 14 tends toward zero. The difference of potential between the collector of the transistor Q1 and the output terminal 14 increases and reaches a value that causes the Zener diode Z4 to conduct, and this difference of potential is placed across the potentiometer R15. The base electrode of the transistor Q6 is then placed at a negative potential intermediary between zero and the potential at the collector electrode of the transistor Q1, according to the position at which the slider of the potentiometer R15 is placed.

The emitter electrode of the transistor Q6 repeats this voltage across the resistor R14. The base electrode of the transistor Q4 is therefore placed at a potential higher than the potential at which it was precedently placed. By adjusting the position of the slider of the potentiometer R15, the potential thus placed upon the base electrode of the transistor Q4 can be set to a value which is slightly less negative than the voltage of the emitter electrode of the transistor Q4, which is, as hereinbefore explained, a constant small negative voltage value determined by the Zener diode Z2. Under these conditions the transistor Q4 conducts and draws current through the resistor R11. This causes a voltage drop across the resistor R11 and lowers the voltage applied to the base electrode of the transistor Q5. This in turn causes the transistor Q5 to conduct and to apply the positive voltage of the source E1 to the base electrode of the regulator transistor Q1 through the resistor R9. The base electrode of the regulator transistor Q1 being at a positive potential, the regulator transistor Q1 is placed in a high impedance state, preventing power from being delivered to the output terminals 14—16.

As soon as the short circuit in the utilization circuit is cleared, the output terminal 14 is no longer at the same potential as the grounded output terminal 16. The lead 32 is no longer directly returned to the ground, but is not returned to the ground through the resistor R6, the potentiometer R7 and the resistor R8. This causes the potential at the slider of the potentiometer R15 and, consequently, the potential at the base electrode of the transistor Q6, to become more negative than it was under the short circuit condition.

The emitter electrode of the transistor Q6 repeats this potential across the resistor R14. This action causes the base electrode of the transistor Q4 to become more negative than it was precedently under the short circuit condition. The base electrode of the transistor Q4 being now placed at a voltage which is more negative than the voltage of its emitter electrode, the latter being, as hereinbefore explained, a constant small negative voltage value determined by the Zener diode Z2, the transistor Q4 is switched to an "off" condition. This action in turn switches the transistor Q5 to an "off" condition which prevents the positive voltage of the source E1, from being applied to the base of the regulator transistor Q1. The regulator transistor Q1 is therefore restored to a high conductance state and the circuit resumes normal operation.

It is obvious that the regulator transistor Q1 can be replaced by two or more transistors placed in parallel, in applications where it is desirable to procure a power supply delivering more current than a sole transistor can carry.

It is also obvious that every PNP type transistor could be replaced by an NPN type transistor and the NPN transistor of the circuit could be replaced by a PNP transistor, as long as the polarities of the appropriate voltages are inverted.

While there have been shown, described and pointed out the fundamental novel features of the invention as applied to the preferred embodiments, it will be understood that various omissions, substitutions and changes in the detail of the devices illustrated and in their operation can be made by those skilled in the art without departing from the spirit and scope of the invention.

What is claimed is:

1. A voltage regulator comprising: a pair of input terminals for connection to a potential source; a pair of output terminals for connection to a utilization circuit; a transistor having its collector-emitter circuit connected in series between the first one of said pair of input terminals and the first one of said pair of output terminals; a current limiting resistor connected in series in said collector-emitter circuit; a common lead connection between the second of said pair of input terminals and the second of said pair of output terminals; a stable voltage reference network connected across the input terminals and comprising a first resistor and a first Zener diode connected in series and a second resistor and a second Zener diode connected in series with one another and in parallel with said first Zener diode; a variable voltage reference network connected across the output terminals and comprising a first resistor, a potentiometer and a second resistor, the slider of said potentiometer providing a voltage signal proportional to the voltage variation across the output terminals; a voltage amplifier transistor having its emitter placed at a fixed potential by being connected to the anode of the second Zener diode, its base connected to the slider of the potentiometer to pick up a voltage signal proportional to the voltage variation across the output terminals, said voltage signal appearing amplified and inverted across a load resistor connected between the collector of the said voltage amplifier transistor and the first input terminal; an emitter follower transistor having its base-collector circuit connected across the load resistor and its emitter connected to the base of the regulator transistor, whereby the voltage of the base of said regulator transistor is subjected to a voltage signal inversely proportional to the voltage variation signal across said output terminals for varying the conductance of the collector emitter circuit of said regulator transistor in a way that compensates the variations of voltage across the output terminals; a circuit breaker network comprising a first transistor of a complementary type having its base connected to the first of the output terminals to sense short circuits across said output terminals, its emitter connected through a resistor to the fixed voltage reference junction at the anode of the second Zener diode and its collector connected through a load resistance to a source of fixed voltage; a second transistor having its base connected through a resistor to the collector of the first transistor, its emitter connected through a third Zener diode to the source of fixed voltage and its collector connected to the base of the emitter follower transistor for rendering the regulator transistor non-conductive of current in the event of a short across the output terminals; and a reset circuit comprising a load between the first input terminal and the base of the first transistor with a switch in series whereby the potential of said first input terminal can be used to bias said base of the first transistor to reset the circuit breaker portion of the circuit to an off condition once the short circuit has been cleared.

2. A voltage regulator as claimed in claim 1 wherein a resistor is in series in the reset circuit and the potential of the first input terminal is dropped across said resistor in the event that the short circuit has not been cleared, thereby preventing resetting the circuit breaker portion of the circuit to an off condition as long as the short circuit has not been cleared.

3. A voltage regulator as claimed in claim 1 wherein the first input terminal is adapted to receive a negative potential; the common lead connection between the second input terminal and the second output terminal is adapted to receive a positive potential and is grounded; and all the transistors are of the PNP type with the exception of the first transistor in the circuit breaker network which is of the NPN complementary type.

4. A voltage regulator comprising: a pair of input terminals for connection to a potential source; a pair of output terminals for connection to a utilization circuit; a transistor having its collector-emitter circuit connected in series between the first one of said pair of input terminals and the first one of said pair of output terminals; a current limiting resistor connected in series in the collector-emitter circuit; a common lead connection between the second of said pair of input terminals and the second of said pair of output terminals; a stable voltage reference network connected across the input terminals and comprising a first resistor and a first Zener diode connected in series and a second resistor and a second Zener diode connected in series with one another and in parallel with said first Zener diode; a variable voltage reference network connected across the output terminals and comprising a first resistor, a potentiometer and a second resistor, the slider of said potentiometer providing a voltage signal proportional to the voltage variation across the output terminals; a voltage amplifier transistor having its emitter placed at a fixed potential by being connected to the anode of the second Zener diode, its base connected to the slider of the potentiometer to pick up a voltage signal proportional to the voltage variation across the output terminals, said voltage signal appearing amplified and inverted across a load resistor connected between the collector of the voltage amplifier transistor and the first input terminal; an emitter follower transistor having its base-collector circuit connected across the load resistor and its emitter connected to the base of the regulator transistor, whereby the voltage of the base of said regulator transistor is subjected to a voltage signal inversely proportional to the voltage variation signal across the output terminals for varying the conductance of the collector emitter circuit of the regulator transistor in a way that compensates the variations of voltage across the output terminals; a circuit breaker network comprising: a third Zener diode and a potentiometer connected between the collector of the regulator transistor and the first output terminal; an emitter follower first transistor having its base connected to the slider of the potentiometer, its collector connected to the anode of the third Zener diode and its emitter connected through a resistor to the common lead connection between the second input terminal and the second output terminal; a second transistor of a complementary type having its base connected to the emitter of the first transistor, its emitter connected through a resistor to the fixed voltage reference junction at the anode of the second Zener diode and its collector connected through a load resistance to a source of fixed voltage; a third transistor having its base connected through a resistor to the collector of the second transistor, its emitter connected through a fourth Zener diode to the source of fixed voltage and its collector connected through a resistor to the base of the regulator transistor, whereby a short circuit across the output terminals renders the third Zener diode conductive thereby triggering the first, second and third transistors and causing said third transistor to become conductive and to apply the potential of said source of fixed voltage to the base of the regulator transistor thus switching said regulator transistor to a non-conductance condition.

5. A voltage regulator as claimed in claim 4 wherein the removal of the short circuit across the output terminals causes the base circuit of the first transistor in the circuit breaker portion of the circuit to be returned to the common lead connection between the second input terminal and the second output terminal through the first resistor, the potentiometer and the second resistor connected across said output terminals, thereby placing said base of the first transistor to a potential that switches said first transistor to an off condition, whereby the circuit breaker portion of the circuit is deactivated.

6. A voltage regulator as claimed in claim 4 wherein the first input terminal is adapted to receive a negative potential; the common lead connection between the second input terminal and the second output terminal is adapted to receive a positive potential and is grounded; all the transistors are of the PNP type with the exception of the second transistor in the circuit breaker network which is of the NPN complementary type.

References Cited in the file of this patent

UNITED STATES PATENTS

| | | |
|---|---|---|
| 2,832,900 | Ford | Apr. 29, 1958 |
| 2,922,945 | Norris et al. | Jan. 26, 1960 |
| 2,963,637 | Osborn | Dec. 6, 1960 |